United States Patent [19]

Burke et al.

[11] Patent Number: 4,533,161

[45] Date of Patent: Aug. 6, 1985

[54] AUTOMATIC HIGH PRESSURE HOSE UNCOUPLING DEVICE

[76] Inventors: Donald D. Burke, 9719 N. Flora, Kansas City, Mo. 64155; Jerry L. Cloninger, 8212 Hadley, Overland Park, Kans. 66204

[21] Appl. No.: 420,646

[22] Filed: Sep. 21, 1982

[51] Int. Cl.³ .............................................. F16L 35/00
[52] U.S. Cl. .......................................... 285/1; 285/39; 285/307
[58] Field of Search ................. 285/1, 2, 39, 304, 307, 285/62, 315, 316; 251/149.3; 137/614.02, 614.04

[56] References Cited

U.S. PATENT DOCUMENTS

| | | | |
|---|---|---|---|
| 2,806,716 | 9/1957 | Brown | 285/1 |
| 3,383,122 | 5/1968 | Richardson | 285/1 |
| 3,386,754 | 6/1968 | Morrison | 285/1 |
| 4,009,729 | 3/1977 | Vik | 137/614.05 |
| 4,060,219 | 11/1977 | Crawford | 137/614.05 X |
| 4,269,226 | 5/1981 | Allread | 285/1 X |
| 4,392,513 | 7/1983 | Parrish | 285/1 X |

Primary Examiner—Dave W. Arola

[57] ABSTRACT

An improved high pressure coupler disconnecting device providing increased force necessary for uncoupling high pressure lines under high pressure at a predetermined point of separation. A flexible high pressure hose attached to the female portion of the coupler is placed through a tower device which surroundably restrains movement of the flexible hose. The tower base, supported by a ring, is positioned in such a manner as to apply lifting force to the female coupler lock sleeve when the tower is moved from the neutral position. The annular construction permits the invention to function in any position around a full 360° sweep from the centrally located release mechanism.

1 Claim, 3 Drawing Figures

AUTOMATIC HIGH PRESSURE HOSE UNCOUPLING DEVICE

FIELD OF INVENTION

This invention generally relates to high pressure fluid and/or gas connections and, specifically to an improved mechanical disconnecting device for use with existing coupling mechanisms.

DISCUSSION OF PRIOR ART

This invention is dependent upon high pressure coupling devices that are commonly found and have the following characteristics in common: They are provided in male and female portions. Each of the coupler halves contain a spring loaded check valve that retains fluids and/or gases in the adjoining lines when the halves are disconnected. The check valves are opened as the coupling halves are joined together, thus permitting unrestricted flow of the contained fluid and/or gas through the coupling. The coupling halves, when coupled, are fixably held together by a snap ring or detent balls in the female half which catch in a recess in the male portion. These retention rings or balls are held in place by a sliding sleeve on the female portion. Movement of the sliding sleeve allows the retention balls or rings to retract themselves from their locked position, thus allowing the coupler to disconnect. Disconnection of the coupler results in a sealing of the contained fluids and/or gases at that point.

Heretofore, high pressure coupling devices relied on manually applied force sliding the locking sleeve to accomplish disconnection. Further, these coupling devices required low or zero pressure within their body at the time of disconnection, as the locking sleeve required too great a force to be manually operated in the pressurized state.

OBJECTS

It is therefore an object of the present invention to provide a device for use with existing coupling mechanisms that apply sufficient force to the locking sleeve of the said couplers to allow disconnection at a predetermined point of separation at full rated pressure.

A further object of the present invention is a device by which a high pressure coupler can be operated in an automatic manner as a safety device separating high pressure lines while preventing the expulsion of gases and/or fluids as the lines separate.

These and other objects of the invention will be readily apparent when considered in reference to the following description and claims and when taken in connection with the attached drawings to which they relate.

DESCRIPTION

Figure 1:
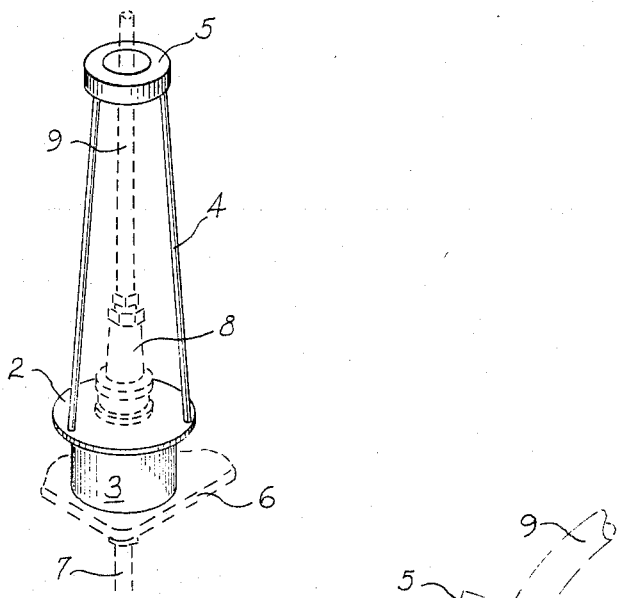
FIG. 1 is a perspective view of the invention.

Referring now to the drawings, there is shown a preferred embodiment of the invention as it would be used to disconnect a high pressure coupler. As readily seen in FIG. 1, the mechanism basically includes a support ring (3), a release ring (2), a plurality of support rods (4), and a hose ring (5).

Support ring (3) is a cup-like member which provides support for the release tower. The release tower consists of a release ring (2), support rods (4), and the hose ring (5). These three components are permanently joined by means of welding or brazing to form a rigid structure, henceforth referred to as the release tower.

Figure 2:
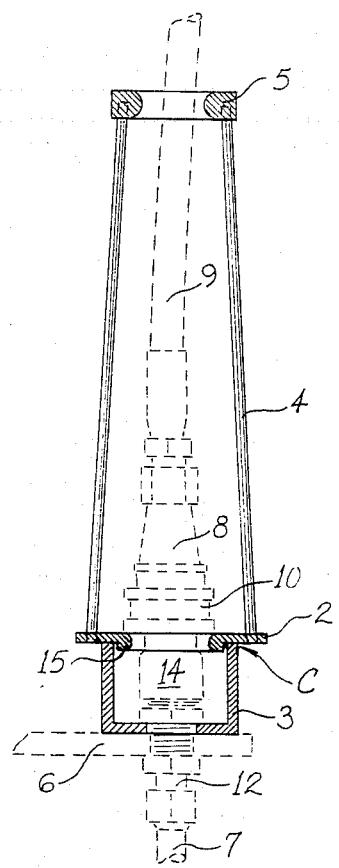
FIG. 2 is a side view of the invention with cross sectional detail shown in the coupled position.

Referring to FIG. 2, it can be seen that support ring (3) is provided with a centrally located hole in its lower surface. A high pressure line (7) is attached to a bulkhead fitting (12) which provides a clamping and locating means for attachment of support ring (3) to the base (6). The male portion of the high pressure coupling (14) is mounted on the upper half of bulkhead fitting (12).

When properly positioned, the release tower release ring (2) is positioned atop support ring (3) located on center by shoulder (15). Entering through hose ring (5), a high pressure hose (9) is attached to the female coupler (8) which is coupled to the male coupler (14). Female coupler lock sleeve (10) is positioned just above release ring (2) when coupled to male coupler (14).

OPERATION

Figure 3:
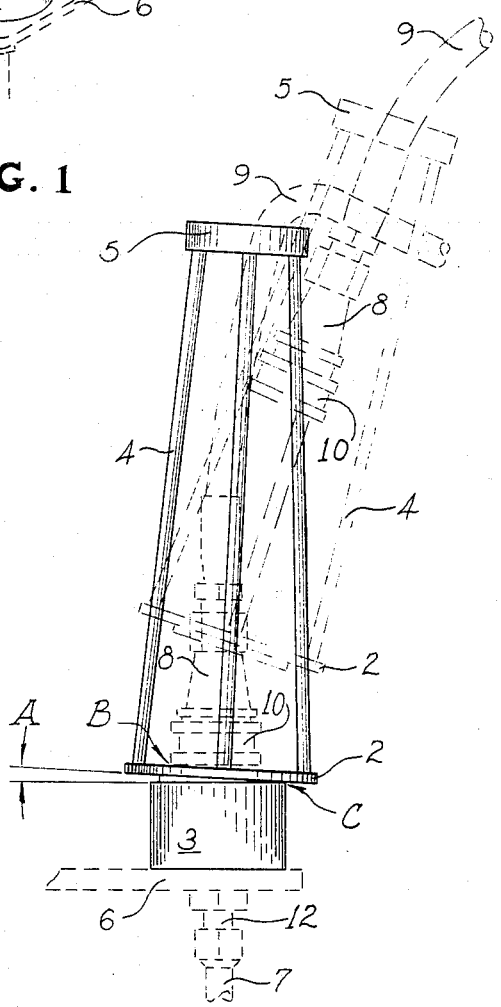
FIG. 3 is a side view showing position of components during and after uncoupling operation.

Referring now to FIG. 3, point (B) represents an infinite number of points around the perimeter on the lower edge of locking sleeve (10). Point (C) represents an infinite number of points around the upper edge and perimeter of support ring (3). High pressure hose (9) is pulled against hose ring (5). This force is transferred to the release ring (2) through the support bars (4) resulting in an angular deflection (A) of the release ring (2). As the release ring (2) pivots on point (C), force is applied to the underside of lock sleeve (10) thus lifting the locking sleeve (10) releasing the female coupling (8) lock mechanism. The female portion of the coupling (8) and release tower are repelled away from the supporting ring (3).

The above mentioned operation, by virtue of the infinite number of points (C and B), will occur at any point in a 360° sweep from the centrally located release mechanism.

Reconnection of coupling halves (8) and (14) is accomplished by venting of all pressure from both coupling halves (8) and (14) and manual reassembly of the separated components into their positions as shown in FIG. 2. The support bars (4) are spaced in such a manner as to permit manipulation of the female coupler (8) and lock sleeve (10) by hand to permit their reconnection to the male coupler (14). The coupling may be repressurized at this time.

While the above description contains many specificities, these should not be construed as limitations on the scope of the invention, but rather as an exemplification of one preferred embodiment thereof. Many other variations are possible. For example, the support ring (3) and base (6) could be made as one component. Shoulder (15) on release ring (2) could be positioned to perform its centering function on the outside perimeter of support ring (3) or positioned to locate on the outside perimeter of lock sleeve (10).

The joining of release ring (2) and hose ring (5) with support rods (4) may be had by combining these parts into a singular machined, moulded, or cast part provided sufficient opening is allowed to permit manual reconnection of the female coupler half (8) to the male coupler half (14).

Release ring (2) may be retained more rigidly against support ring (3) with the addition of tension springs taut between the release ring (2) and the base (6) thus permitting operation in an inverted position.

Accordingly, the scope of the invention should be determined not by the embodiment illustrated, but by the appended claims and their legal equivalents.

We claim:

1. A high pressure coupling disconnecting device for use with a high pressure coupling means provided with male and female halves interlocked when coupled by engagement of a plurality of balls housed in the female half of said coupling which engage an annular recess in the male half of said coupling, the balls retained in place by a locking sleeve around the female half of the high pressure coupling such that movement of the sleeve away from the coupled end of the female coupling half allows the balls to retreat from the recess in the male coupling half permitting the high pressure coupling to seperate, said disconnecting device comprised of (a) an annular support ring means adapted to concentrically surrounding the high pressure male coupler means, said support ring adapted to be fixably attached by the high pressure male coupler means to a base element means, and (b) an elongated tower element means consisting of an annular release ring, a plurality of rods and a hose containment means, said annular release ring resting concentrically atop said support ring and adapted to be around the high pressure male coupler means, said release ring is provided with an aperture sized to permit its retension atop said support ring only by the locking sleeve of the female coupler while the female coupler means is coupled with the male coupler means said plurality of rods being circumferentially spaced around and fixed to said release ring and hose containment means, said hose containment means adapted to loosely encircle the high pressure hose at a location remote from said coupling while remaining unattached to the hose the high pressure hose is adapted to be attached only to said female coupler means, such that when the male and female couplers are connected and under pressure sufficient tension applied by the high pressure hose against said hose containment means from an angle will impart leverage through said tower element means displacing said release ring against both said support ring and the female coupler locking sleeve with sufficient force to displace the female coupler locking sleeve permitting the high pressure coupling means to disconnect.

* * * * *